(12) United States Patent
Kawatsu

(10) Patent No.: US 11,856,163 B2
(45) Date of Patent: Dec. 26, 2023

(54) IMAGE READING APPARATUS AND IMAGE FORMING APPARATUS

(71) Applicant: Konica Minolta, Inc., Tokyo (JP)

(72) Inventor: Kenji Kawatsu, Kodaira (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 17/736,217

(22) Filed: May 4, 2022

(65) Prior Publication Data
US 2022/0360677 A1    Nov. 10, 2022

(30) Foreign Application Priority Data

May 6, 2021  (JP) .................................. 2021-078380

(51) Int. Cl.
*H04N 1/00* (2006.01)
*H04N 1/60* (2006.01)

(52) U.S. Cl.
CPC ....... *H04N 1/00543* (2013.01); *H04N 1/0057* (2013.01); *H04N 1/6027* (2013.01); *H04N 1/6033* (2013.01)

(58) Field of Classification Search
CPC .................... H04N 1/00543; H04N 1/0057
See application file for complete search history.

(56) References Cited

U.S. PATENT DOCUMENTS

| | | | | |
|---|---|---|---|---|
| 9,065,948 B2 * | 6/2015 | Sugizaki | ................ | G03G 15/60 |
| 2004/0179242 A1 * | 9/2004 | Nakaya | ................ | H04N 1/4076 |
| | | | | 358/1.9 |
| 2007/0064285 A1 * | 3/2007 | Kohara | ............. | H04N 1/00519 |
| | | | | 358/498 |
| 2013/0003138 A1 * | 1/2013 | Sugizaki | ............ | H04N 1/00633 |
| | | | | 358/448 |
| 2013/0321876 A1 * | 12/2013 | Nagai | ................ | H04N 1/00045 |
| | | | | 358/461 |
| 2013/0321877 A1 * | 12/2013 | Nagai | ................ | H04N 1/00679 |
| | | | | 358/461 |
| 2014/0226191 A1 * | 8/2014 | Enomoto | ........... | H04N 1/00615 |
| | | | | 358/496 |

(Continued)

FOREIGN PATENT DOCUMENTS

| | | | | | |
|---|---|---|---|---|---|
| JP | 2017112451 A | * | 6/2017 | ............. | G03G 15/01 |
| JP | 2017112451 A | | 6/2017 | | |
| JP | 2021164102 A | * | 10/2021 | | |

*Primary Examiner* — Ted W Barnes
(74) *Attorney, Agent, or Firm* — CANTOR COLBURN LLP

(57) ABSTRACT

An image reading apparatus includes: a reader that reads an image on a print medium, and is arranged at a reading position of a conveyance path for conveying the print medium that is continuous and has a long length; a shading unit including a reference color member to perform shading correction of correcting a read value of an image sensor in the reader; a mover that moves the shading unit between the reading position of the reader and a retreated position; and a retractor that retracts the print medium from the reading position of the reader, wherein the retractor arranges the print medium at the reading position of the reader at a time of reading by the reader, and retracts the print medium from the reading position of the reader at an end of reading by the reader, to secure a predetermined space between the reader and the print medium.

7 Claims, 5 Drawing Sheets

(56) References Cited

U.S. PATENT DOCUMENTS

| | | | | |
|---|---|---|---|---|
| 2015/0350493 A1* | 12/2015 | Sakatani | .............. | H04N 1/6091 |
| | | | | 358/504 |
| 2018/0288235 A1* | 10/2018 | Kawatsu | ............ | H04N 1/00087 |
| 2019/0146399 A1* | 5/2019 | Fukai | .................... | G03G 15/652 |
| | | | | 399/397 |
| 2020/0041947 A1* | 2/2020 | Fukai | ..................... | G03G 15/01 |
| 2020/0195798 A1* | 6/2020 | Izawa | ................ | H04N 1/00037 |
| 2022/0094815 A1* | 3/2022 | Heishi | .................. | H04N 1/4076 |

* cited by examiner

IMAGE READING APPARATUS AND IMAGE FORMING APPARATUS

CROSS REFERENCE TO RELATED APPLICATIONS

The present invention claims priority under 35 U.S.C. § 119 to Japanese Application No. 2021-078380, filed on May 6, 2021, the entire contents of which being incorporated herein by reference.

BACKGROUND

Technological Field

The present invention relates to an image reading apparatus and an image forming apparatus, and more particularly to technology provided with an image sensor or a colorimeter and applied at a time of reading an image.

Description of the Related Art

When printing is performed on a print medium such as paper or a film in an image forming apparatus, whether printing has been correctly performed is inspected by reading an image printed on the print medium with a scanner or the like and comparing the read image data with print original data.

As such an inspection, for example, the entire printed image is read by the scanner, and print quality is determined such as whether the print image is stained or whether an adhesion amount of ink is correct.

The scanner needs to periodically read a shading member serving as a color sample instead of the print medium and perform shading correction for correcting the read value.

JP 2017-112451 A describes technology of performing shading correction by moving a shading member for shading correction, to a reader included in an image forming apparatus.

Meanwhile, a scanner reads an image formed on a print medium in a state of being very close to paper or a film that is a print medium. Specifically, a tip end of the scanner and the print medium are close to each other at a distance of about several mm. Therefore, when dust or the like adheres to glass on a reading surface at the tip end of the scanner, cleaning needs to be performed after the print medium is once removed from a reading apparatus to secure a space where an operator can work near the glass on the reading surface. Therefore, there has been a problem that maintenance of the scanner and the like takes time and effort.

In particular, when a continuous print medium such as long roll paper or a long roll film is used as the print medium, it takes much time and effort to remove the print medium from the apparatus in the middle of printing. Therefore, when maintenance of the scanner is required in the middle of printing, a large amount of time has been required.

In addition, in a reader such as a scanner, it is necessary to perform shading correction work by moving a shading member to the reader as described in JP 2017-112451 A. Here, since a distance between the tip end of the scanner and the print medium is short as described above, it is necessary to perform shading correction in a situation where the long continuous print medium is unable to be removed. Therefore, it has been necessary to downsize the shading member and arrange the shading member in a slight gap, and there has been a problem that a mechanism for shading correction becomes complicated.

SUMMARY

An object of the present invention is to provide an image reading apparatus and an image forming apparatus capable of easily performing maintenance and correction of a reader such as a scanner when the reader is provided.

To achieve the abovementioned object, according to an aspect of the present invention, an image reading apparatus reflecting one aspect of the present invention comprises: a reader that reads an image formed on a print medium, and is arranged at a reading position of a conveyance path for conveyance of the print medium that is continuous and has a long length; a shading unit including a reference color member to perform shading correction of correcting a read value of an image sensor arranged in the reader; a mover that moves the shading unit between the reading position of the reader and a retreated position; and a retractor that retracts the print medium from the reading position of the reader, wherein the retractor arranges the print medium at the reading position of the reader at a time of reading by the reader, and retracts the print medium from the reading position of the reader at an end of reading by the reader, to secure a predetermined space between the reader and the print medium.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Hereinafter, one or more embodiments of the present invention will be described with reference to the drawings. However, the scope of the invention is not limited to the disclosed embodiments.

[Overall Configuration]

Figure 1:
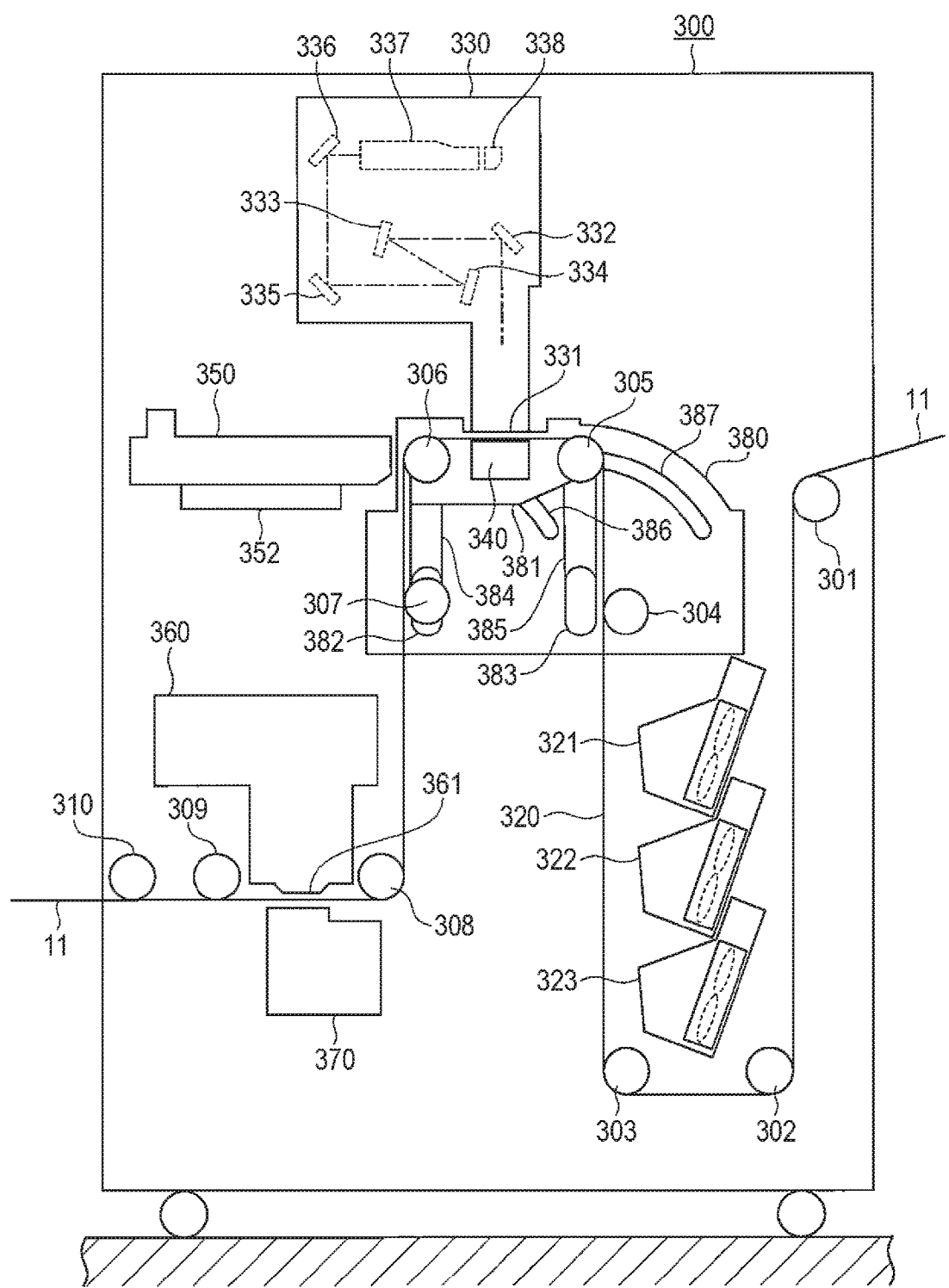
FIG. 1 is a configuration view illustrating an example of an image reading apparatus according to an embodiment of the present invention.
Figure 2:
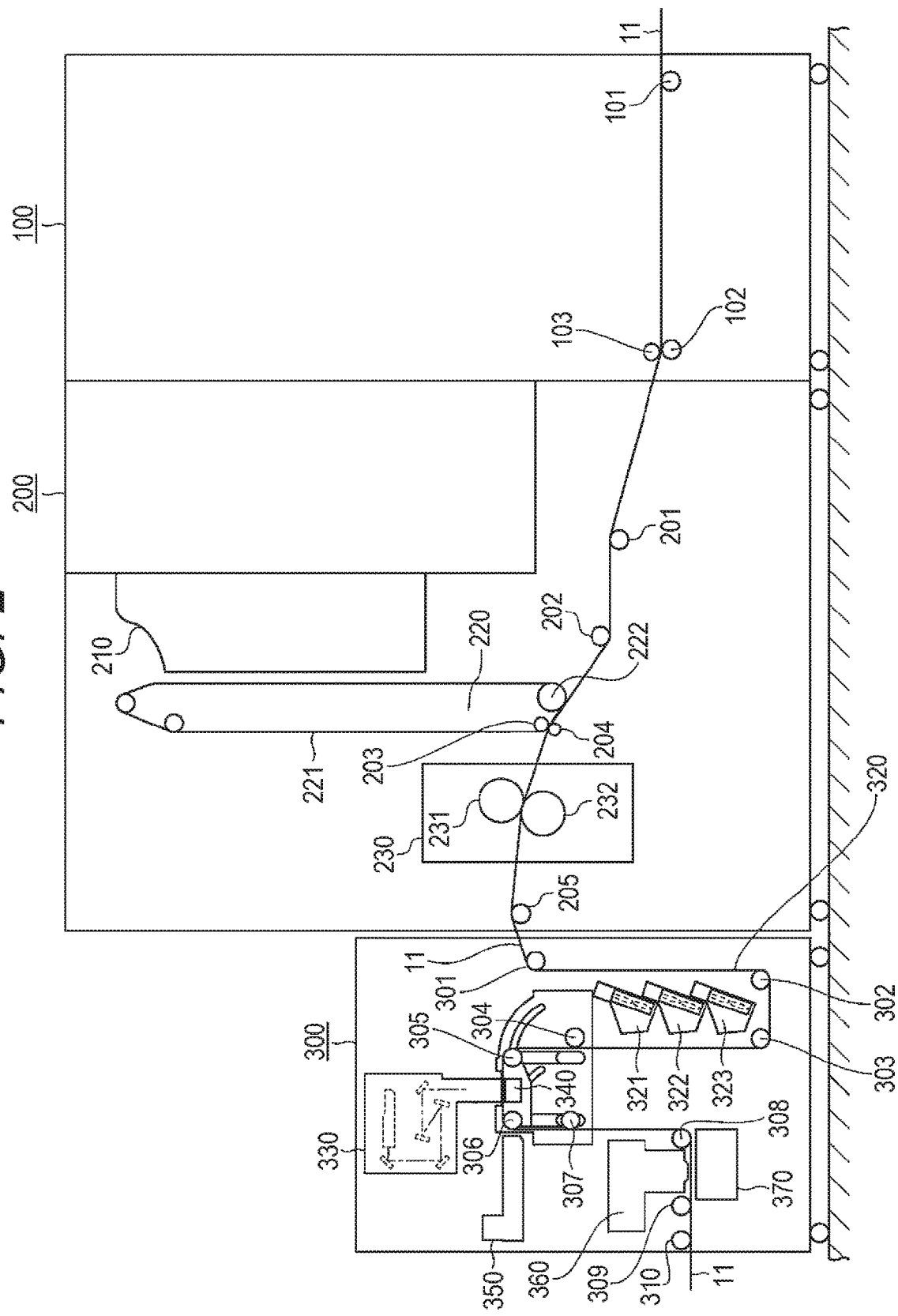
FIG. 2 is a configuration view illustrating an example of an entire image forming apparatus to which the image reading apparatus according to an embodiment of the present invention is connected.

FIG. 1 illustrates a configuration of an image reading apparatus of the present embodiment, and FIG. 2 illustrates an overall configuration as an image forming apparatus to which the image reading apparatus of the present embodiment is connected. FIG. 1 and FIG. 2 illustrate a configuration on a conveyance path of a print medium on which image formation is performed, in each apparatus.

First, before describing an image reading apparatus 300 illustrated in FIG. 1, an overall configuration connected to the image forming apparatus will be described with reference to FIG. 2.

In the example illustrated in FIG. 2, a paper feeding apparatus 100, an image forming apparatus 200, and the image reading apparatus 300 are connected in order from a right side. Note that the entire system in which the paper feeding apparatus 100 and the image reading apparatus 300 are connected to the image forming apparatus 200 as illustrated in FIG. 2 can also be regarded as an image forming apparatus. However, in the following description, a single apparatus that performs an image forming process is referred to as the image forming apparatus 200. In addition, a continuous print medium 11, which is a long print medium that can be mounted on the image forming apparatus 200 of the present embodiment, may be a medium formed by paper or a film of various colors other than white, in addition to a medium formed by white paper or film. Furthermore, a medium formed by a transparent or semitransparent film can be used.

The continuous print medium 11 is supplied from a paper-supply-side roller (not illustrated) to the paper feeding apparatus 100, and a plurality of rollers 101 to 103 are arranged on a conveyance path of the continuous print medium 11. Then, the paper feeding apparatus 100 performs a process of feeding the continuous print medium 11 to the image forming apparatus 200 at a predetermined speed.

The image forming apparatus 200 includes a toner image forming unit 210, a transfer part 220, and a fixing part 230 as processing parts constituting an image former. The toner image forming unit 210 forms toner images of respective colors such as yellow Y, magenta M, cyan C, black K, and white W on a transfer belt 221 of the transfer part 220.

The transfer part 220 transfers the toner images of the respective colors formed on the transfer belt 221, to a front surface of the continuous print medium 11 with a transfer roller 222.

The fixing part 230 includes fixing rollers 231 and 232, heats the continuous print medium 11 by passing the continuous print medium 11 between the fixing rollers 231 and 232, and fixes the print image, which is the transferred image, to the continuous print medium 11. Note that, in the fixing part 230, the continuous print medium 11 is heated to, for example, about 100° C.

In addition to the transfer roller 222 and the fixing rollers 231 and 232, a plurality of rollers 201 to 205 are arranged in a way of the conveyance path of the continuous print medium 11 in the image forming apparatus 200. However, the roller 205 alone in contact with a back surface side (a side opposite to the surface on which the print image is formed) of the continuous print medium 11 is arranged on a downstream side in a conveyance direction from the fixing part 230 of the conveyance path, and a front surface side of the continuous print medium 11 is not in contact with the roller. Each of the rollers 201 to 205 is made of metal, for example. In the following description, downstream or upstream is downstream or upstream as viewed from the conveyance direction of the continuous print medium 11.

The continuous print medium 11 on which the print image has been formed by the image forming apparatus 200 is sent to the image reading apparatus 300.

Note that, an operation panel (not illustrated) is attached to the image forming apparatus 200 and start or stop of an image forming (printing) operation on the continuous print medium 11, various mode settings, and the like are performed in response to an instruction from a control unit (not illustrated) in the image forming apparatus 200 based on a button operation or the like on the operation panel.

[Configuration of Image Reading Apparatus]

Next, a configuration of the image reading apparatus 300 will be described with reference to FIG. 1.

The image reading apparatus 300 includes a cooling unit 320, a scanner unit 330, a shading unit 350, and a colorimeter unit 360. The continuous print medium 11 sequentially passes through these units. In addition, the scanner unit 330 includes a scanner backing part 340, and the colorimeter unit 360 includes a colorimeter backing part 370.

Furthermore, a plurality of rollers 301 to 310 are arranged in a way of the conveyance path of the continuous print medium 11 in the image reading apparatus 300. Each of the rollers 301 to 310 is made of metal, for example.

The continuous print medium 11 conveyed into the image reading apparatus 300 passes near the cooling unit 320. In the cooling unit 320, a plurality of cooling fans 321 to 323 are arranged to cool the continuous print medium 11. FIG. 1 shows a configuration in which the continuous print medium 11 is vertically conveyed from an upper side to a lower side, and the conveyed continuous print medium 11 is cooled by three cooling fans 321 to 323 arranged vertically. As the cooling fans 321 to 323, for example, a type called a sirocco fan in which a plate-shaped blade is attached to a rotating cylinder is used. Alternatively, a fan including a propeller may be used as the cooling fans 321 to 323.

Since the continuous print medium 11 is heated to about 100° C. by the fixing part 230 of the image forming apparatus 200 as described with reference to FIG. 2, the continuous print medium 11 has a high temperature of, for example, about 70° C. at a time of being supplied to the image reading apparatus 300. Therefore, cooling air from the cooling fans 321 to 323 is supplied toward the continuous print medium 11, to cool the continuous print medium 11 to about room temperature.

In a case where it is necessary to arrange a plurality of (three) cooling fans 321 to 323 in the conveyance direction to provide sufficient cooling performance, vertical arrangement of the conveyance path of the continuous print medium 11 and vertical (longitudinal) arrangement of the individual cooling fans 321 to 323 as illustrated in FIG. 1 contribute to miniaturization of the image reading apparatus 300. That is, if the conveyance path is arranged horizontally and the plurality of cooling fans are arranged in a horizontal direction, the image reading apparatus 300 accordingly becomes large in the horizontal direction, which is not preferable. However, the configuration of the present embodiment enables downsized configuration of the image reading apparatus 300.

Although the three cooling fans 321 to 323 are arranged in the vertical direction in FIG. 1, a plurality of cooling fans may also be arranged in a horizontal direction (a direction from the front toward the back in FIG. 1) when a horizontal width of the continuous print medium 11 is wide. For example, a total of nine cooling fans of three in the vertical direction x three in the horizontal direction may be installed.

Further, in the conveyance path of the continuous print medium 11, the roller 301 arranged between taking in of the continuous print medium 11 by the image reading apparatus 300 and the cooling by the cooling unit 320 is arranged to be in contact with a back surface of the continuous print medium 11, that is, a surface opposite to the image forming surface. Moreover, as described with reference to FIG. 2, the roller 205 arranged on the downstream side of the fixing part 230 in the image forming apparatus 200 is also arranged to be in contact with the back surface of the continuous print medium 11.

As a result, the image forming surface does not come into contact with the roller or the like until the continuous print medium 11 heated by the fixing part 230 of the image forming apparatus 200 is cooled by the cooling unit 320. Therefore, it is possible to inhibit toner and ink from being disturbed when an image formed on the continuous print medium 11 comes into contact with the roller in a high temperature state, and it is possible to contribute to high image quality of the print image.

The continuous print medium 11 cooled by the cooling unit 320 is conveyed upward by the two rollers 302 and 303, passes through the rollers 304 and 305, and is conveyed horizontally in an upper part in the image reading apparatus 300. The scanner unit 330 is arranged in proximity to the front surface of the horizontally conveyed continuous print medium 11.

The scanner unit 330 is one of readers included in the image reading apparatus 300.

In the scanner unit 330 illustrated in FIG. 1, image light incident into the unit from a paper proximity surface 331 is reflected by plurality of mirrors 332 to 336, then passes through an optical system 337, and forms an image on an image sensor 338. Then, the image recorded on the continuous print medium 11 is read by the image sensor 338. The image sensor 338 can include, for example, a line sensor.

Data of the image read by the scanner unit 330 is supplied to an image inspection processing part (not illustrated), and inspection processing is performed as to whether the image formed by the image forming apparatus 200 is equal to an original, that is, whether the image is the same as the original.

Note that, as illustrated in FIG. 1, by forming an image on the image sensor 338 in a state where there is a certain optical path length in the scanner unit 330, a range in which the image can be correctly formed on the image sensor 338 can be widened. Therefore, according to the configuration illustrated in FIG. 1, the image formed on the front surface of the continuous print medium 11 can be correctly read by the image sensor 338.

On an opposite side to the paper proximity surface 331 of the scanner unit 330 with the continuous print medium 11 in between, the scanner backing part 340 is arranged. The scanner backing part 340 is for setting a background color to an appropriate color at a time of reading by the scanner unit 330.

The scanner backing part 340 is attached to a roller holding member 381 of a retractor 380. The roller holding member 381 is a member that holds the two rollers 305 and 306 arranged on the upstream side and the downstream side of the scanner unit 330. This roller holding member 381 performs a process of retracting the continuous print medium 11.

That is, the roller holding member 381 of the retractor 380 is connected to two leg parts 384 and 385 turnable about turning fulcrums 382 and 383. Then, the conveyance path of the continuous print medium 11 can be separated from the scanner unit 330 to a retracted position by turning the leg parts 384 and 385 along guide grooves 386 and 387 curved in a circular shape.

When the conveyance path of the continuous print medium 11 is separated from the scanner unit 330 by movement of the roller holding member 381, the scanner backing part 340 attached to the roller holding member 381 also moves to the retracted position in conjunction. When the roller holding member 381 moves to the retracted position, a traveling direction of the conveyance path of the continuous print medium 11 is changed by the rollers 304 and 307 in addition to the rollers 305 and 306. Note that a state when the roller holding member 381 moves to the retracted position will be described later.

The operation of moving the roller holding member 381 of the retractor 380 to the retracted position and the operation of returning to an original position are performed by driving a drive mechanism (not illustrated) such as a motor built in the retractor 380. In addition, the operation of moving the roller holding member 381 to the retracted position and the operation of returning to the original position may be performed by manual operation, by the operator holding the roller holding member 381 with a hand.

Note that, a length of the conveyance path of the continuous print medium 11 when the conveyance path of the continuous print medium 11 is at the retracted position away from the scanner unit 330 is substantially equal to a length of the conveyance path of the continuous print medium 11 when the continuous print medium 11 is at a position close to the scanner unit 330.

Beside the roller holding member 381 (on a left side in FIG. 1), the shading unit 350 is arranged. The shading unit 350 can be moved in a horizontal direction (a left-right direction in FIG. 1) by driving by a mover 352. Then, the shading unit 350 can be moved to a position directly below the scanner unit 330 in a state where the roller holding member 381 is moved away from the scanner unit 330.

The continuous print medium 11 having passed through the scanner unit 330 is vertically conveyed downward by the roller 306 and is brought again into a conveyance state in the horizontal direction by the roller 308.

Close to a front surface (upper surface) of the continuous print medium 11 that is conveyed in the horizontal direction by the roller 308, the colorimeter unit 360 is arranged.

The colorimeter unit 360 is one of readers included in the image reading apparatus 300.

A colorimeter is built in the colorimeter unit 360, and the colorimeter unit 360 performs colorimetry processing of measuring a color of a specific spot of the continuous print medium 11. Then, for example, a color of an image read by the scanner unit 330 is corrected based on the colorimetric result in the colorimeter.

On an opposite side to the paper proximity surface 361 of the colorimeter unit 360 with the continuous print medium 11 in between, the colorimeter backing part 370 is arranged. The colorimeter backing part 370 is for setting a background color to an appropriate color at a time of reading by the colorimeter unit 360.

The continuous print medium 11 having passed through the colorimeter unit 360 is conveyed to the outside of the image reading apparatus 300 via the rollers 309 and 310 and wound as a winding roll (not illustrated).

[Operation Example of Retractor and Shading Unit]

Figure 3:
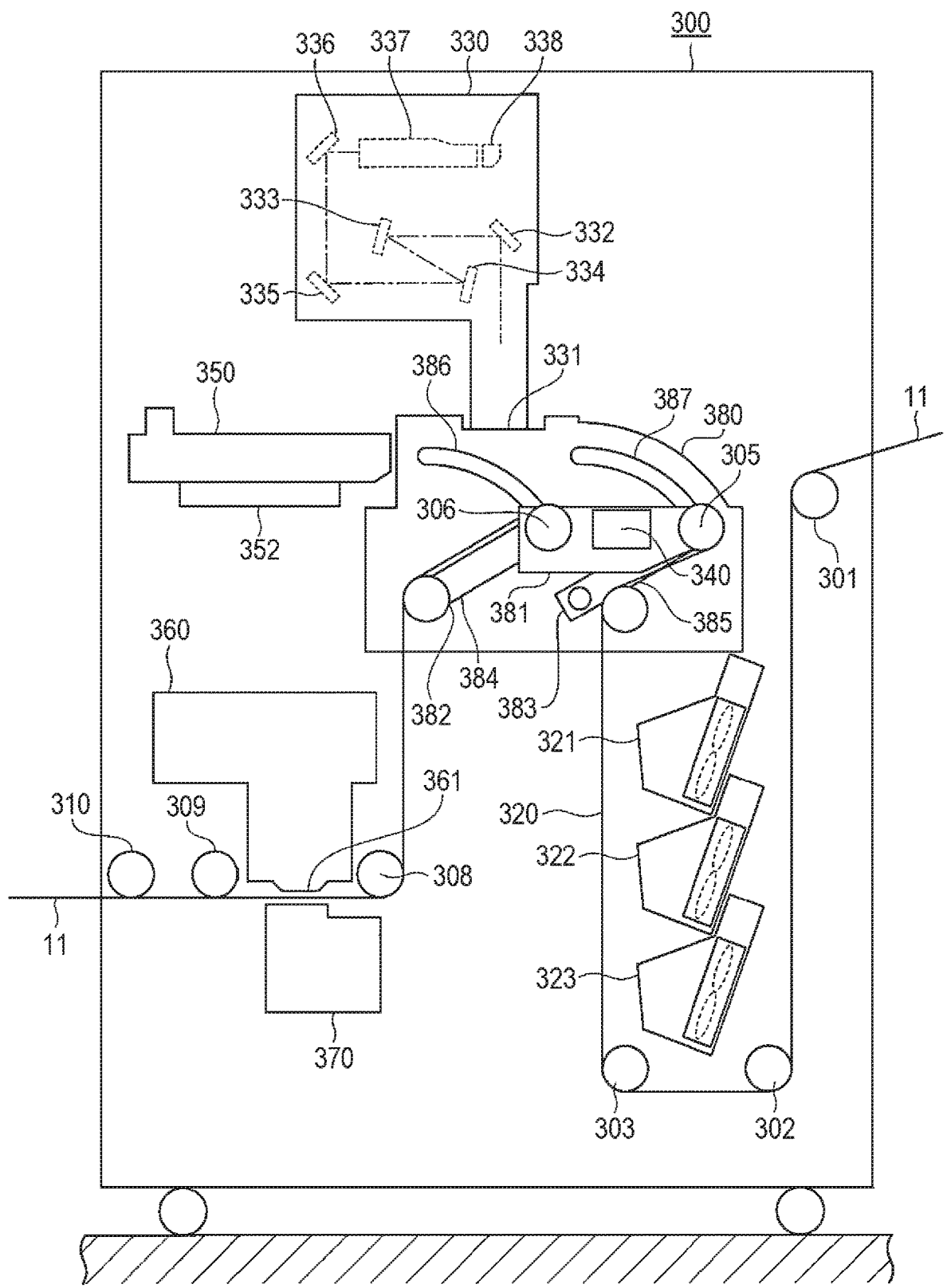
FIG. 3 is a configuration view illustrating an operation example (a state where a conveyance path of a print medium is retreated) of the image reading apparatus according to an embodiment of the present invention.

FIG. 3 illustrates a state when the roller holding member 381 of the retractor 380 is moved to the retracted position.

As illustrated in FIG. 3, when the leg parts 384 and 385 are turned along the guide grooves 386 and 387 curved in a circular shape, the roller holding member 381 can be moved to the retracted position. The movement to the retracted position is automatically performed by a drive mechanism built in the retractor 380 but can be manually performed by the operator.

As an example, in which the retraction operation is automatically performed by the drive mechanism built in the retractor 380, for example, when a button for an instruction of the retraction of the reader is operated on an operation panel (not illustrated) of the image forming apparatus 200, the retraction operation is automatically performed by the retractor 380. Alternatively, the retraction operation is automatically performed by the retractor 380 also when there is an operation of performing shading correction or when a timing for performing shading correction comes.

Further, the manual operation is performed by attaching a lever for manual operation to the roller holding member 381 or the like in advance, and the operator gripping the lever to move the roller holding member 381. Note that, even when the manual operation is performed, a sensor (not illustrated) in the image reading apparatus 300 detects the roller holding member 381 being at the retracted position, and the image reading apparatus 300 and the image forming apparatus 200 perform operation control suitable for the retracted position similarly to the automatic driving.

As illustrated in FIG. 3, by moving the roller holding member 381, a sufficient space can be secured between the paper proximity surface 331 of the scanner unit 330 and the continuous print medium 11. Therefore, for example, the operator can perform maintenance work such as cleaning the paper proximity surface 331 (the glass surface) of the scanner unit 330 by using the secured space.

Figure 4:
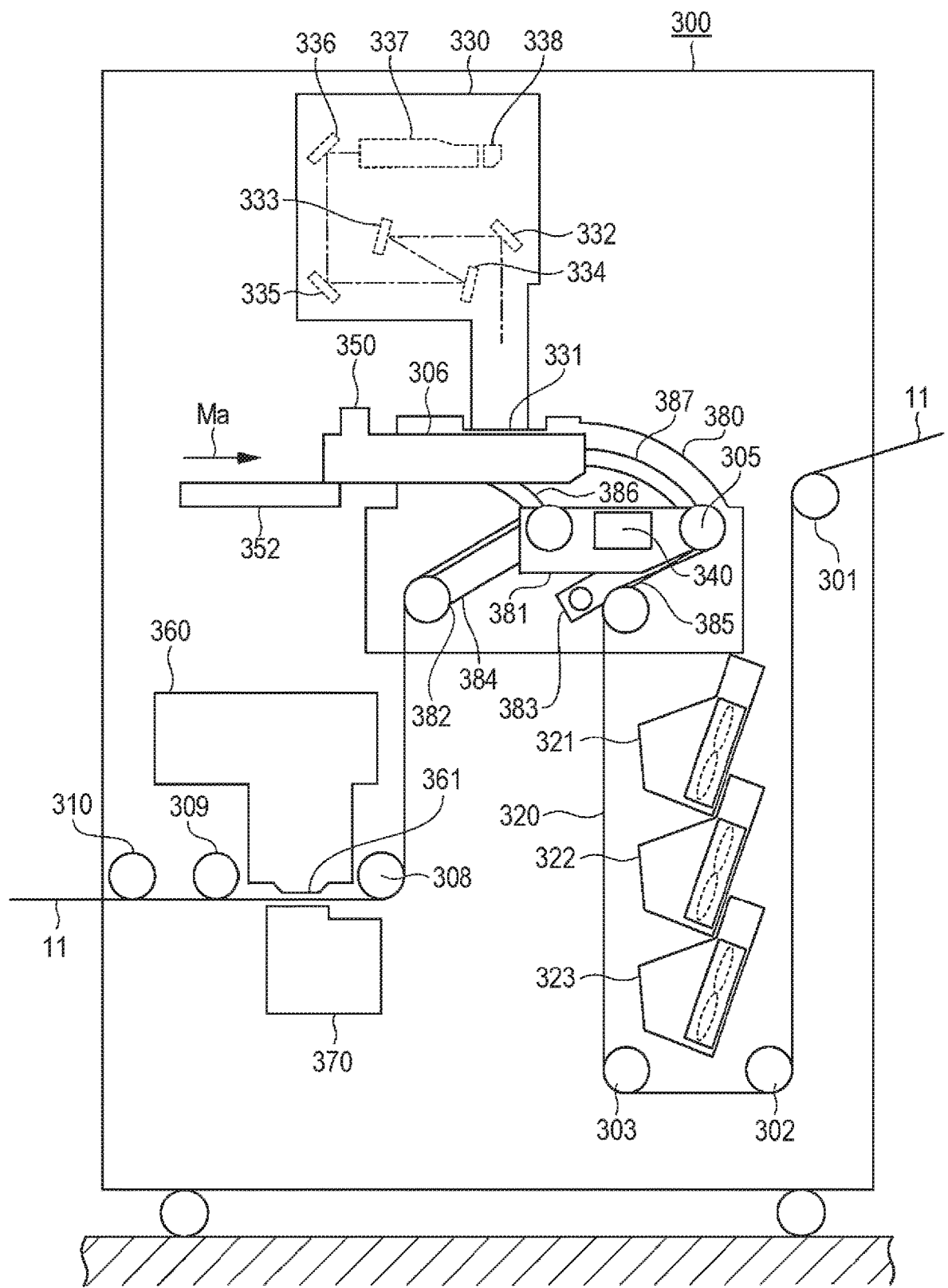
FIG. 4 is a configuration view illustrating an operation example (a state where a shading unit has moved directly below a scanner) of the image reading apparatus according to an embodiment of the present invention.

FIG. 4 illustrates a state where the roller holding member 381 of the retractor 380 is moved to the retracted position, and then the shading unit 350 is moved in a horizontal direction Ma (movement to a right side in FIG. 4) to perform shading correction.

As illustrated in FIG. 4, the shading unit 350 is inserted into a space generated by moving the roller holding member 381 of the retractor 380 to the retracted position. Therefore, the shading unit 350 can be configured in a sufficient size, and the shading unit 350 and a drive mechanism can be installed in a reasonable arrangement.

Figure 5:
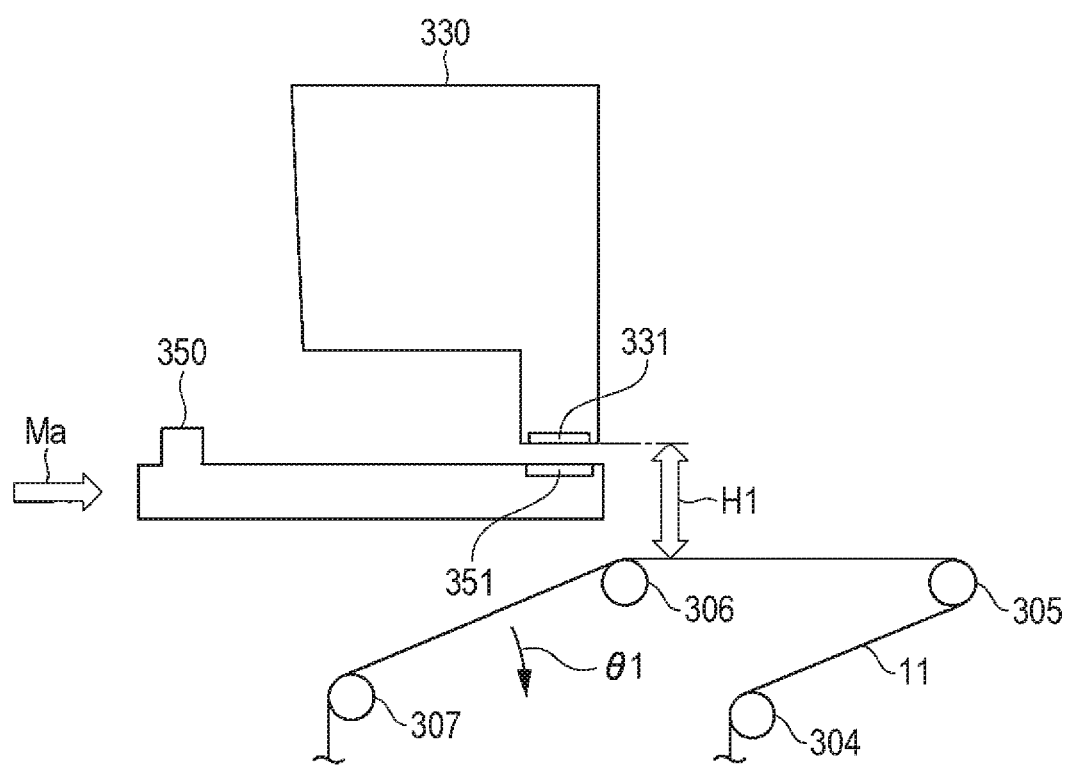
FIG. 5 is a view illustrating details of a state where a conveyance path of a print medium is retreated, according to an embodiment of the present invention.

FIG. 5 is a view illustrating a retracted state of the continuous print medium 11 and a positional relationship of the shading unit 350 with the scanner unit 330 when being moved.

As illustrated in FIG. 5, when the roller holding member 381 of the retractor 380 retracts, the rollers 305 and 306 move in a 01 direction, which causes a predetermined height H1 to be secured between the paper proximity surface 331 of the scanner unit 330 and the continuous print medium 11.

Thus, by configuring the shading unit 350 with a thickness within this height H1, the shading unit 350 can be moved directly below the scanner unit 330.

When the shading unit 350 is positioned directly below the scanner unit 330, a reference color member 351 arranged in the shading unit 350 comes close to and faces the paper proximity surface 331. Therefore, the image sensor 338 (FIG. 1) in the scanner unit 330 can perform shading correction for correcting a read value, by scanning a spot of a reference color formed on the reference color member 351.

Since this shading correction is performed while the continuous print medium 11 is mounted on the conveyance path, it is not necessary to remove the continuous print medium 11 at the time of shading correction, and the shading correction can be performed efficiently at any time.

Note that, when the shading correction illustrated in FIG. 5 is performed, the reading of the continuous print medium 11 by the scanner unit 330 is stopped. Therefore, it is preferable to stop image formation on the continuous print medium 11 in the image forming apparatus 200 until reading of the continuous print medium 11 by the scanner unit 330 is restarted after the stop.

However, at the time of shading correction, inspection by the scanner unit 330 is unable to be performed merely temporarily. Therefore, when productivity of printing work is prioritized, it is also possible to continuously perform the image formation on the continuous print medium 11 in the image forming apparatus 200 and the conveyance of the continuous print medium 11 on which the image is formed, even in the state illustrated in FIG. 5.

Therefore, it is preferable that the image reading apparatus 300 of the present embodiment is able to select first processing and second processing as an operation mode at the time of performing the shading correction and the like. In the first processing and the second processing, it is possible to select a mode in advance as to which processing is to be performed by, for example, a button operation or the like on an operation panel of the image forming apparatus.

The first processing is a mode to be selected when the inspection is reliably performed and is an operation mode in which image formation on the continuous print medium 11 in the image forming apparatus 200 is stopped until the reading is restarted from when reading for inspection of the continuous print medium 11 is stopped. In the first processing, at an end of reading by the scanner unit 330 as a reader, the continuous print medium 11 is retracted from a reading position by the retractor 380, and a predetermined space is secured between the scanner unit 330 and the continuous print medium 11. Then, at a start of reading by the scanner unit 330 after completion of shading correction or maintenance of the scanner unit 330, the retractor 380 performs a process of returning the continuous print medium 11 to the original reading position.

The second processing is a mode to be selected when productivity of printing is prioritized, and is an operation mode in which, after stopping of reading for inspection of the continuous print medium 11, retracting of the continuous print medium 11 from the reading position by the retractor 380, and securing of a predetermined space between the scanner unit 330 and the continuous print medium 11, image formation on the continuous print medium 11 by the image forming apparatus 200 is continuously performed, and conveyance of the continuous print medium 11 is also continuously performed along with the image formation until the retractor 380 returns to the original position and the scanner unit 330 restarts reading.

Furthermore, in the image reading apparatus 300 of the present embodiment, even when the continuous print medium 11 is retracted by the retractor 380, a length of the entire conveyance path is substantially the same as that when the continuous print medium 11 is not retracted, and a defect such as deflection does not occur in execution of the retraction operation.

Furthermore, in a case of the operation mode of performing the first processing described above, since a spot on the continuous print medium 11 where the inspection by the scanner unit 330 is stopped can be made substantially equal to a spot where the inspection is restarted, the inspection can be performed at all spots.

[Modifications]

Note that, in the above-described embodiment, as illustrated in FIG. 2, the present invention is applied to the image reading apparatus 300 that is connected to the image forming apparatus 200 and performs image reading simultaneously with image formation. On the other hand, a print medium on which an image has already been formed by a separate image forming apparatus may be mounted on a single image reading apparatus to perform image reading.

Further, as the image forming apparatus 200, as illustrated in FIG. 2, a configuration in which a toner image is fixed to a print medium by the fixing part 230 is also an example, and the present invention may be applied to an image forming apparatus of another type such as an inkjet type using ink.

Furthermore, although the image reading apparatus described in the above-described embodiment performs shading correction of the scanner unit 330, the colorimeter unit 360 may also perform correction by a similar mechanism.

Furthermore, the configuration for performing image reading as the scanner unit 330 illustrated in FIG. 1 is also an example, and image reading may be performed by a sensor having another configuration. For example, the image reading may be performed with a scanner having a configuration in which a line sensor is arranged on the paper proximity surface 331, without using an optical system such as a lens.

Although embodiments of the present invention have been described and illustrated in detail, the disclosed embodiments are made for purposes of illustration and example only and not limitation. The scope of the present invention should be interpreted by terms of the appended claims.

What is claimed is:

1. An image reading apparatus comprising:
    a reader that reads an image formed on a print medium, and is arranged at a reading position of a conveyance path for conveyance of the print medium that is continuous and has a long length,
    a shading unit including a reference color member to perform shading correction of correcting a read value of an image sensor arranged in the reader,
    a mover that moves the shading unit between the reading position of the reader and a retreated position along a linear path; and
    a retractor that retracts the print medium from the reading position of the reader,
    wherein
    the retractor arranges the print medium at the reading position of the reader at a time of reading by the reader and retracts the print medium from the reading position of the reader at an end of reading by the reader, to secure a predetermined space between the reader and the print medium into which the mover moves the shading unit, and
    one or more guide rollers are moved along a curvilinear path to the retracted position by the retractor thus retracting the print medium to the retracted position.

2. The image reading apparatus according to claim 1, wherein
    by the conveyance path continuously conveying the print medium having a long length and retracted by the retractor, image formation on the print medium is able to be continuously performed in an image forming apparatus connected to the image reading apparatus, during retraction by the retractor.

3. The image reading apparatus according to claim 1, wherein
    image formation on the print medium in an image forming apparatus connected to the image reading apparatus is stopped until the print medium is returned to the reading position of the reader by the retractor, after reading of the print medium is stopped and the print medium is retracted from the reading position of the reader by the retractor.

4. The image reading apparatus according to claim 1, wherein
    it is possible to select:
    first processing of continuously performing image formation on the print medium in an image forming apparatus connected to the image reading apparatus during retraction by the retractor, by the conveyance path continuously conveying the print medium having a long length and retracted by the retractor; and
    second processing of stopping image formation on the print medium in an image forming apparatus connected to the image reading apparatus until the print medium is returned to the reading position of the reader by the retractor, after reading of the print medium is stopped and the print medium is retracted from the reading position of the reader by the retractor.

5. The image reading apparatus according to claim 1, wherein
    a conveyance length of the print medium conveyed by the conveyance path is made substantially equal between when the print medium is retracted by the retractor and when the print medium is not retracted.

6. The image reading apparatus according to claim 1, wherein
    the retractor is able to retract the print medium from the reading position of the reader by manual operation or driving based on a predetermined operation instruction.

7. An image forming apparatus comprising:
    an image former that forms an image on a print medium and is arranged at a first spot in a way of a conveyance path for conveyance of the print medium having a long length,
    a reader that is arranged at a second spot downstream of the first spot in a conveyance direction in a way of the conveyance path, and reads an image formed on the print medium by the image former,
    a shading unit including a reference color member to perform shading correction of correcting a read value of an image sensor arranged in the reader,
    a mover that moves the shading unit between the second spot of the reader and a retreated position along a linear path; and
    a retractor that retracts the print medium from the second spot near the reader,
    wherein
    the retractor arranges the print medium at the second spot at a time of reading by the reader and retracts the print medium from the second spot at an end of reading by the reader, to secure a predetermined space between the reader and the print medium into which the mover moves the shading unit, and
    one or more guide rollers are moved along a curvilinear path to the retracted position by the retractor thus retracting the print medium to the retracted position.

* * * * *